United States Patent
Gremmert

(10) Patent No.: US 7,403,843 B2
(45) Date of Patent: Jul. 22, 2008

(54) SYSTEMS AND METHODS FOR AUTOMATED DESELECTION OF FLIGHT PLAN INFORMATION FROM A DISPLAY

(75) Inventor: Scott R. Gremmert, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 328 days.

(21) Appl. No.: 11/010,713

(22) Filed: Dec. 13, 2004

(65) Prior Publication Data
US 2006/0129285 A1  Jun. 15, 2006

(51) Int. Cl.
*G01C 23/00* (2006.01)

(52) U.S. Cl. .................. 701/3; 701/8; 701/9; 701/13; 701/14; 340/945

(58) Field of Classification Search ............. 701/1, 701/3, 6, 7, 8, 9, 13, 14; 340/945, 963
See application file for complete search history.

(56) References Cited

U.S. PATENT DOCUMENTS

| 6,112,141 A | 8/2000 | Briffe et al. |
| 6,282,466 B1 | 8/2001 | Nolte et al. |
| 6,314,370 B1 * | 11/2001 | Curtright .................. 701/213 |
| 6,643,580 B1 | 11/2003 | Naimer et al. |
| 6,906,641 B2 * | 6/2005 | Ishihara .................. 340/946 |
| 2004/0111192 A1 | 6/2004 | Naimer et al. |

* cited by examiner

*Primary Examiner*—Gertrude Arthur Jeanglaude

(57) ABSTRACT

Systems and methods for automatically switching to a track view mode on a vertical view display. The system determines aircraft position relative to a leg of a flight plan and switches display mode for a navigation vertical display to track view mode, if the display mode is in a plan view mode and if the determined relative position is greater than a threshold distance.

14 Claims, 4 Drawing Sheets

SYSTEMS AND METHODS FOR AUTOMATED DESELECTION OF FLIGHT PLAN INFORMATION FROM A DISPLAY

BACKGROUND OF THE INVENTION

Many aircraft include a number of navigation displays, particularly, a plan view display and a vertical view display. The plan view display is a top-down view of a navigation map that may display various information, such as terrain data, weather data, traffic data and navigation data. The vertical view display illustrates a side view of either where the aircraft is currently headed or what is expected along the flight plan of the aircraft.

On a typical flight the air crew selects the mode of the vertical view display in order to get an overall picture of what they will be seeing on the next leg or legs of their flight plan. However, if the aircraft is deviating from their flight plan, the information displayed on the vertical view display may not present obstacles that are along the aircraft's current track. If the air crew is attentive, they will switch to the track view mode of the vertical view display in such situation. However, this may not always occur. Therefore, there exists a need for a switching device that automatically switches from the flight plan vertical view mode to the track view mode of the vertical view display.

One attempt to resolve this issue has been to perform an automatic switch based solely on angular deviation between the angular track of the aircraft and the direction of the leg of the flight plan. However, unnecessary automatic switches may occur when the deviation is greater than the threshold limit, but the aircraft is on or very close to their present track.

Therefore, there exists a need for methods and systems for more intelligently switching from flight plan view mode of the vertical view display to the track view mode.

BRIEF DESCRIPTION OF THE DRAWINGS

The preferred and alternative embodiments of the present invention are described in detail below with reference to the following drawings.

FIG. 5 illustrates a flow diagram illustrating a detailed exemplary process performed by the system shown in FIG. 1.

DETAILED DESCRIPTION

Figure 1:
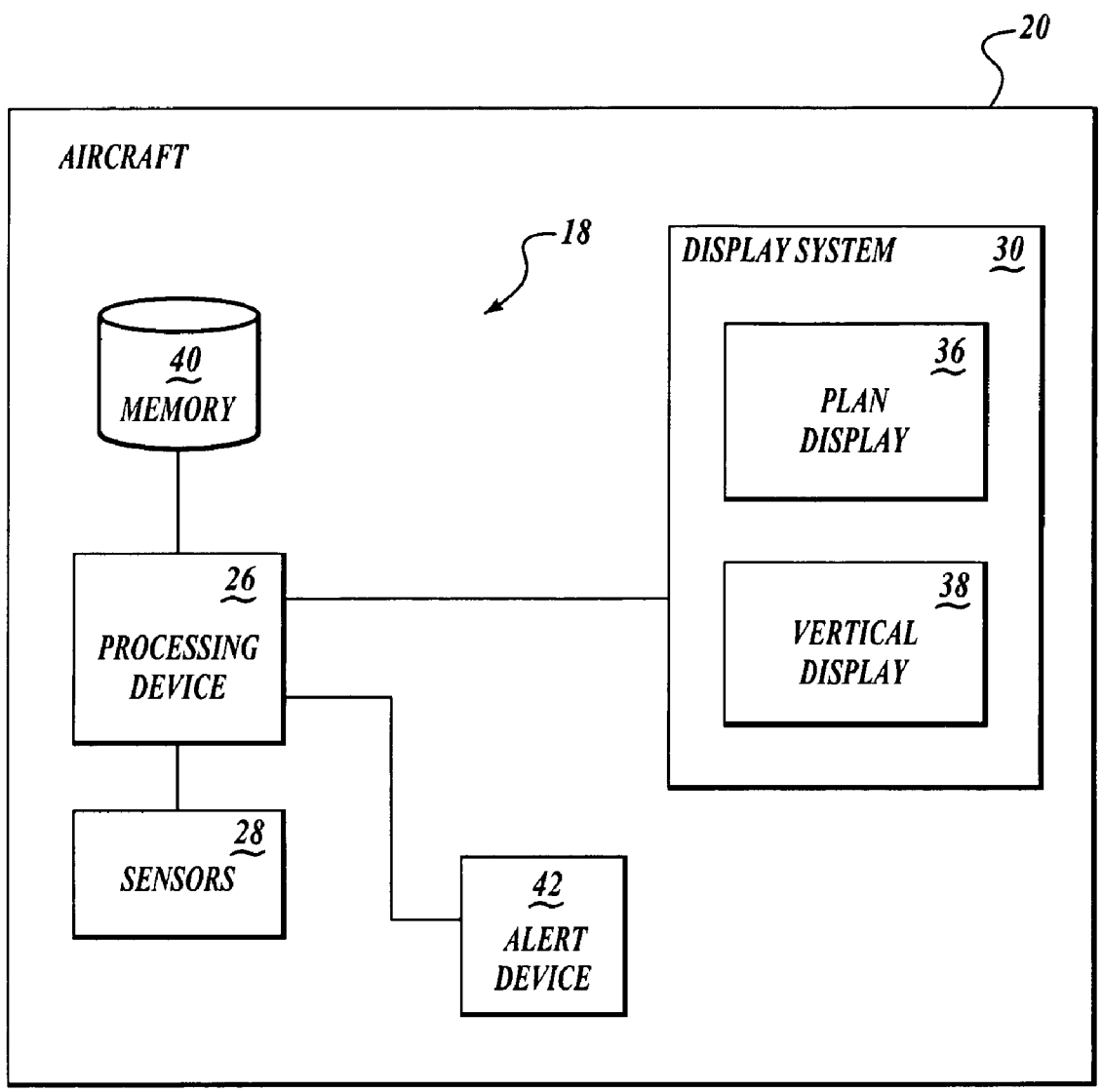
FIG. 1 illustrates a block diagram of an exemplary system formed in accordance with an embodiment of the present invention.

FIG. 1 illustrates a block diagram of an example system 18 on board an aircraft 20. The system 18 illustrates an embodiment of the present invention. The example system 18 includes a processing device 26, such as a Flight Management System (FMS), coupled to one or more sensors 28 and a display device 30. The display device 30 includes at least a vertical view display 38. The display device 30 may also include a plan view display 36.

The processing device 26 receives various data, such as position and track data from the sensors 28. The sensors 28 may include a Global Positioning System (GPS), an inertial reference system (IRS), or other position determining devices. The device 26 may also be linked to memory 40 that stores flight data information, such as an aircraft flight plan that includes course and geometry information for legs of the flight plan. The device 26 processes the information stored in the memory 40 and the information from the sensors 28 to generate images to be displayed on either the plan view display 36 and/or the vertical view display 38. The device 26 may also be in communication with an alerting device 42 that alerts the flight crew that a switch of the image presented in the vertical view display 38 has occurred. The alerting device 42 may be a visual or audio alerting device (e.g., icon, light, speaker, etc.), or may be integrated into the displays 36 and 38, or into other pre-existing equipment used within a cockpit of the aircraft 20.

Figure 2:
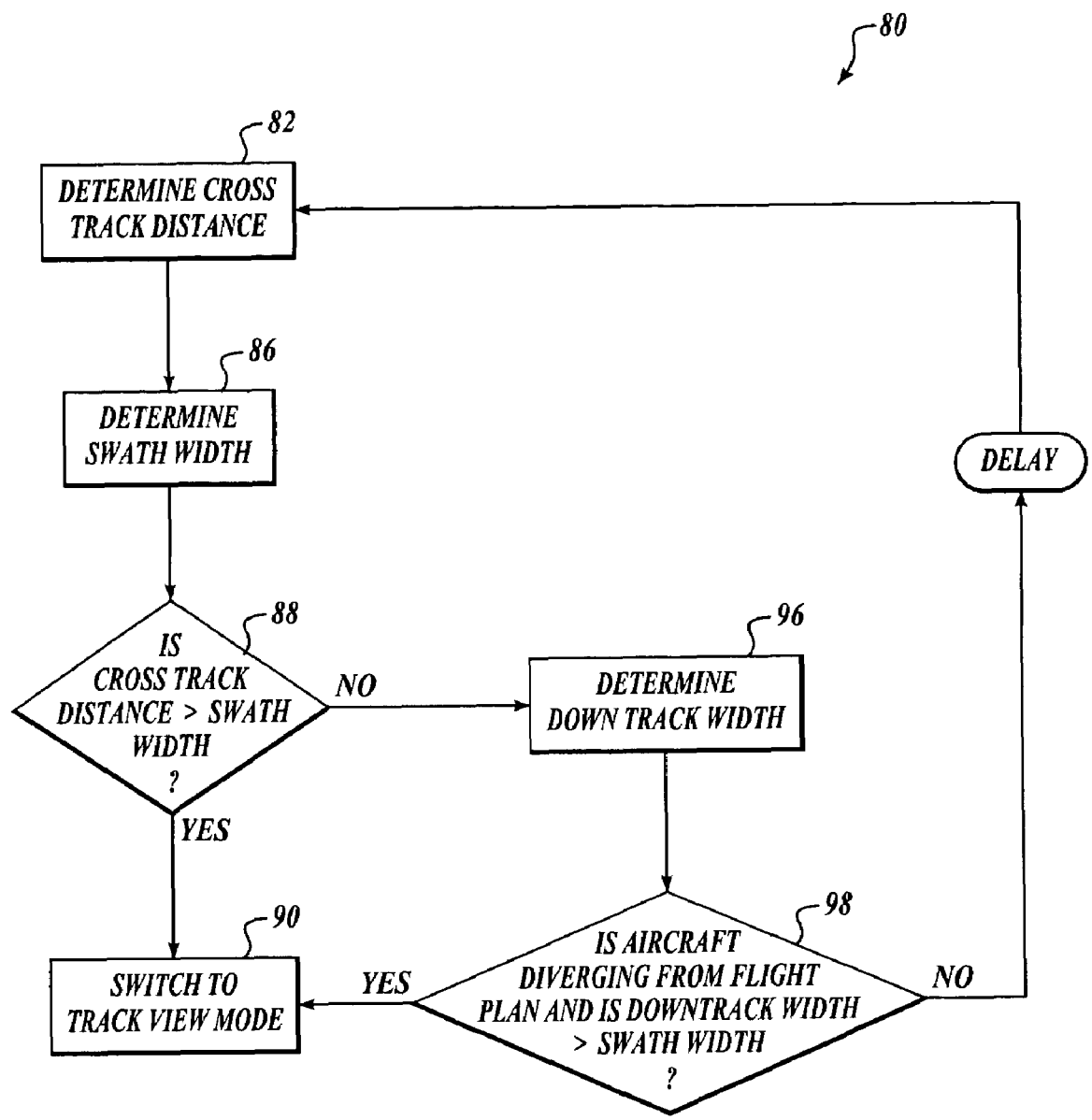
FIGS. 2 and 5 illustrate methods performed by the system shown in FIG. 1.
Figure 3:
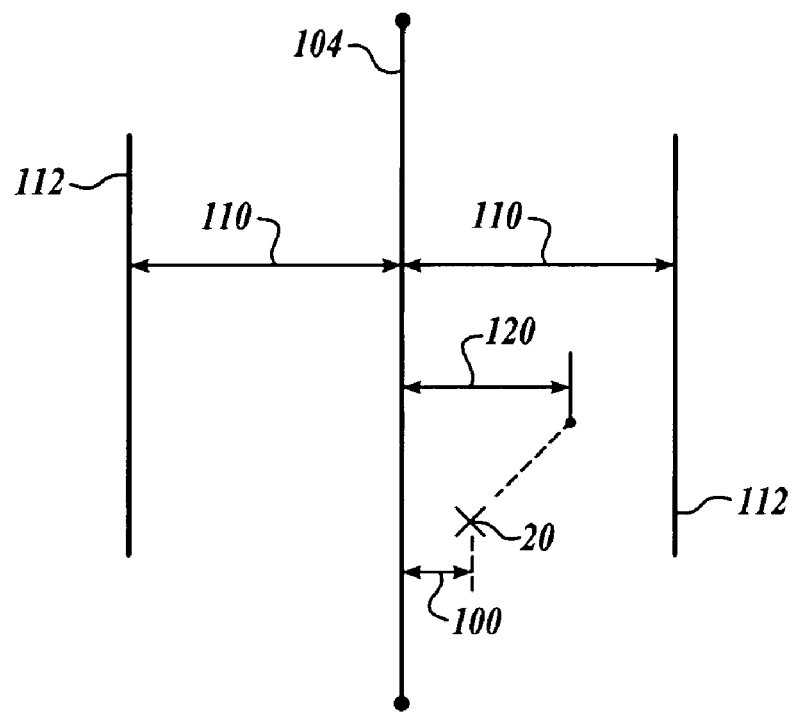
FIGS. 3 and 4 illustrate geometrical relationships used by the processes shown in the flow diagrams of FIGS. 2 and 5.

FIG. 2 illustrates an example process 80 performed by the system shown in FIG. 1. First at a block 82, the device 26 determines cross-track distance. The cross-track distance is the distance between the position of the aircraft 20 and a leg of the flight plan that the aircraft 20 is presently on. As shown in FIG. 3, the distance 100 is the cross-track distance and that distance is the perpendicular distance between the aircraft's position and the intended path of the flight plan leg. Next, at a block 86, the device 26 determines a swath width. Referring to FIG. 3, the swath width is a distance 110 between the intended path 104 and a swath width boundary 112. The swath width 110 may vary depending upon one or more different factors, for example, stage of flight (cruise, ascent, descent, etc.), type of aircraft, or any other pre-determined factor.

Next, at a decision block 88, the device 26 determines if the determined cross-track distance 100 is greater than the swath width distance 110. If the cross-track distance is determined to be greater than the swath width distance 110, the device 26 switches the vertical view display 38 into a track view mode if the vertical view display was previously in a flight plan view mode. If the cross-track distance is not greater than the swath width distance 110, the device 26 determines a down-track width distance. FIG. 3 illustrates an example down-track width distance 120. The down-track width distance 120 is determined by projecting a vector from the aircraft's present position based on the aircraft's present ground speed and track. The perpendicular distance between the intended path 104 and a point at the end of the projected vector is the down-track width distance 120.

Next, at a decision block 98, the device 26 determines if the aircraft is diverging from the intended path 104 and the down-track width distance 120 is greater than the swath width distance 110. If the answer to the determination made at decision block 98 is no, then the process 80 is delayed a pre-determined set amount of time and then returned to the block 82. If the result of the decision at the decision block 98 is yes, the device 26 switches to the track view mode if previously in the flight plan view mode.

Figure 4:
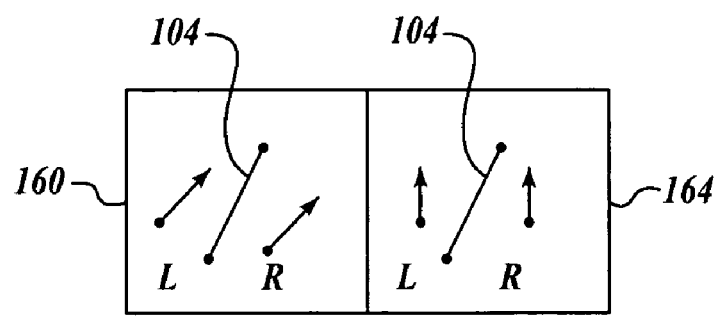

As shown in FIG. 4, example converging and diverging situations are illustrated. In a pair of scenarios shown in block 160, an aircraft to the left of the intended path 104 is converging into the intended path 104 and an aircraft to the right of the intended path 104 is diverging from the intended path 104. A block 164 illustrates an aircraft to the left of the intended path 104 is diverging from the intended path 104 and an aircraft to the right of the intended path 104 is converging with the intended path 104. Thus, two diverging situations may occur out of a possible four flight situations.

In another embodiment, after or simultaneously when the switch to the track view mode has occurred (block 90), an alert signal is sent to the alerting device 42 thereby alerting the flight crew that a switch of the modes of the vertical view display 38 has occurred.

Figure 5:
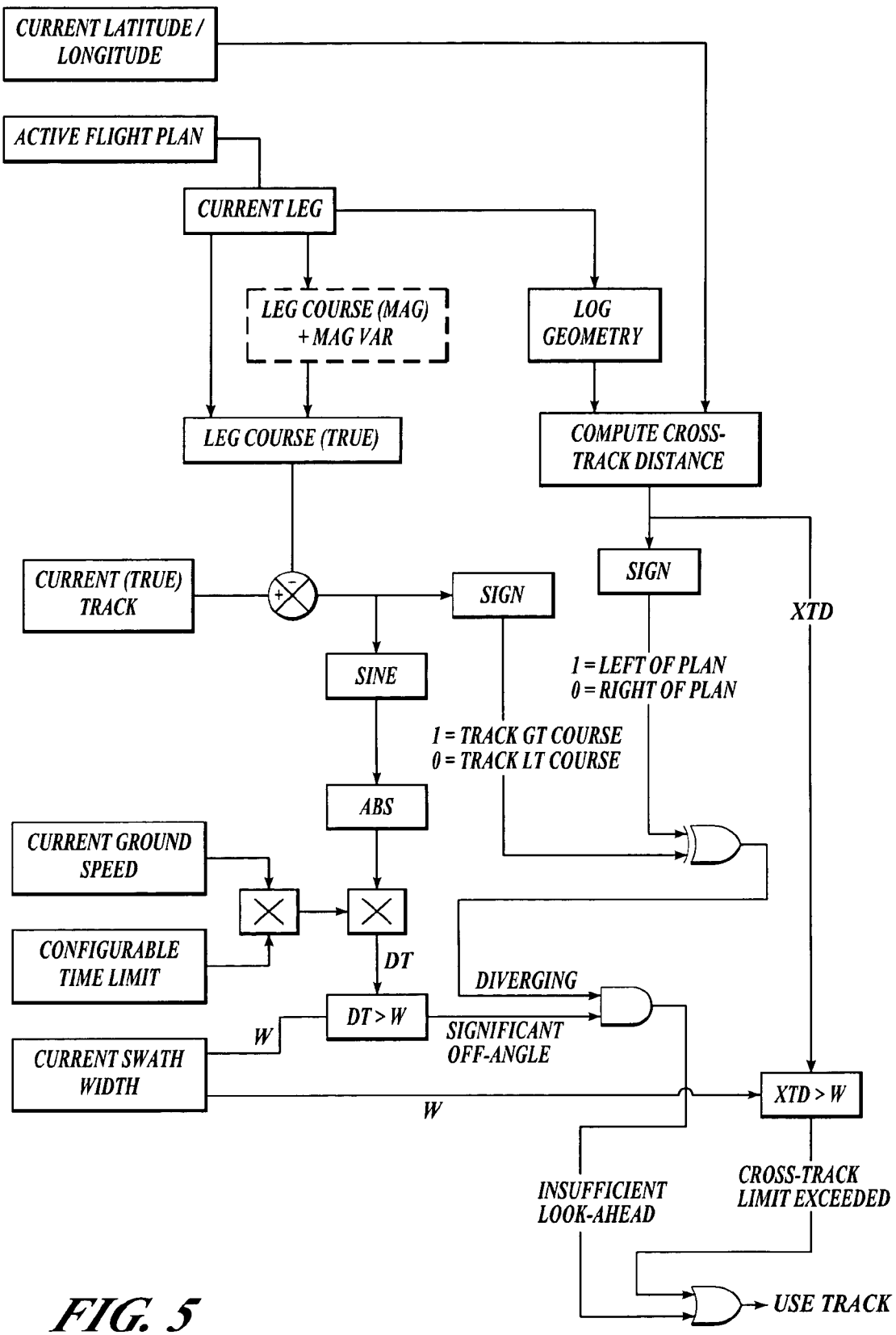

FIG. 5 shows a more detailed process that performs the same function as the process 80 shown in FIG. 2. A cross-track distance XTD is determined based on current latitude/longitude position of the aircraft and the current leg of the flight plan. If the XTD is greater than the current swath width W, then track view mode is used.

The true course of the current leg is subtracted from the current true track of the aircraft. If the true track is greater than the true course, a high ("1") signal is produced. If the true track is less than the true course, a low ("0") signal is produced. If the aircraft is to the left of the flight plan, a high ("1") signal is produced and a low ("0") signal is produced if the aircraft is to the right of the flight plan. Divergence between the true course and the flight plan is determined by exclusive or-ing the signals. If divergence is occurring and a downtrack distance is greater than W, then the track view mode is used.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method comprising:
   determining aircraft position relative to a leg of a flight plan;
   switching display mode for a navigation display to track view mode, if the display mode is in a plan view mode and if the determined relative position is greater than a first threshold distance.

2. The method of claim 1, further comprising generating an alert signal if the display mode is switched to the track view mode.

3. The method of claim 1, wherein the pre-defined threshold is based on mode of flight of the aircraft.

4. The method of claim 1, wherein the relative position is a cross-track distance.

5. The method of claim 1, wherein aircraft position relative to the leg of the flight plan includes:
   determining a down-track width based on aircraft speed, track, and a pre-defined amount of time.

6. The method of claim 5, wherein switching includes switching if the aircraft is determined to be diverging from the present leg of the flight plan and the down-track width is greater than a second threshold distance.

7. The method of claim 6, wherein the first and second threshold distances are equal.

8. An aircraft navigation display system comprising:
   one or more components configured to determine aircraft position, direction and speed;
   a navigation display configured to display in a plan view mode and a track view mode;
   a processor coupled to the navigation display components, the processor being configured to determine aircraft position relative to a leg of a flight plan and switch display modes of the navigation display to the track view mode, if the display mode is in the plan view mode and if the determined relative position is greater than a first threshold distance.

9. The system of claim 8, wherein the processor generates an alert signal if the display mode is switched to the track view mode.

10. The system of claim 8, wherein the pre-defined threshold is based on mode of flight of the aircraft.

11. The system of claim 8, wherein the relative position is a cross-track distance.

12. The system of claim 8, wherein the processor determines a down-track width based on aircraft speed, track, and a pre-defined amount of time.

13. The system of claim 12, wherein the processor switches to the track view mode if the aircraft is determined to be diverging from the present leg of the flight plan and the down-track width is greater than a second threshold distance.

14. The system of claim 13, wherein the first and second threshold distances are equal.

* * * * *

UNITED STATES PATENT AND TRADEMARK OFFICE
CERTIFICATE OF CORRECTION

PATENT NO. : 7,403,843 B2  Page 1 of 1
APPLICATION NO. : 11/010713
DATED : July 22, 2008
INVENTOR(S) : Scott Gremmert It is certified that error appears in the above-identified patent and that said Letters Patent is hereby corrected as shown below:

Column 3, line 25, claim 1 should read:

1. (Currently Amended): A method comprising:
determining aircraft position relative to a leg of a flight plan;
switching display mode for a navigation display to track view mode, if the display mode is in a <u>flight</u> plan view mode and if the determined relative position is greater than a first threshold distance.

Column 4, line 11, claim 8 should read:

8. (Currently Amended): An aircraft navigation display system comprising:
one or more components configured to determine aircraft position, direction and speed;
a navigation display configured to display in a <u>flight</u> plan view mode and a track view mode;
a processor coupled to the navigation display components, the processor being configured to determine aircraft position relative to a leg of a flight plan and switch display modes of the navigation display to the track view mode, if the display mode is in the <u>flight</u> plan view mode and if the determined relative position is greater than a first threshold distance.

Signed and Sealed this

Twenty-second Day of December, 2009

David J. Kappos
*Director of the United States Patent and Trademark Office*